Oct. 7, 1969  R. RUPRECHT  3,470,756
SHEAVE STRUCTURE

Filed Dec. 11, 1967  2 Sheets-Sheet 1

INVENTOR.
Robert Ruprecht
BY
Michael S Striker
ATTORNEY

Oct. 7, 1969    R. RUPRECHT    3,470,756
SHEAVE STRUCTURE
Filed Dec. 11, 1967    2 Sheets-Sheet 2

INVENTOR
Robert Ruprecht
BY
ATTORNEY

United States Patent Office 3,470,756
Patented Oct. 7, 1969

3,470,756
SHEAVE STRUCTURE
Robert Ruprecht, Aichelberg, Kreis Esslingen, Germany, assignor to Heinkel, Ernst Aktiengesellschaft, Stuttgart-Zuffenhausen, Germany
Filed Dec. 11, 1967, Ser. No. 689,433
Claims priority, application Germany, Dec. 14, 1966, H 61,288
Int. Cl. F16h 55/56
U.S. Cl. 74—230.17                8 Claims

ABSTRACT OF THE DISCLOSURE

A first flange is fixedly mounted on a rotatable shaft. A ring member is arranged on the shaft for freedom of axial and rotational movement relative thereto. A second flange is arranged on the shaft intermediate the ring member and the first flange with which it is coupled for freedom of axial movement relative thereto. The second flange has a tendency to axial movement away from the first flange. An engaging member is axially spaced from the ring member and is movable between a first position in which it engages the same and urges it axially against the second flange while preventing rotation of the ring member, and a second position in which it is axially spaced from the ring member so that the latter is free to move axially and angularly under the influence of the second flange. Cooperating limiting projections are provided on the engaging member and the ring member for limiting the angular displacement of the ring member with reference to the engaging member when the latter moves to the second position thereof.

BACKGROUND OF THE INVENTION

The present invention relates generally to sheaves, and more particularly to variable sheaves. Still more specifically, the invention relates to improvements in the mounting of axially movable components in variable sheaves.

It is well known that variable belt transmissions ordinarily include two variable sheaves each of which comprises a flange which is fixed and another flange which is axially movable. One of the movable flanges is displaced whenever the ratio of the transmission is changed, so that the belt automatically changes the axial position of the other movable flange.

Transmissions of this type are widely used and in a great variety of application. One of the two sheaves involved is provided in these arrangements with an adjusting device and with a ring member which is mounted on the shaft of the sheave and which is pressed by the adjusting device against the axially movable flange. Thus, the position of the axially movable flange with respect to the fixed flange can be changed by advancing the adjusting device further, causing it to press against the ring member which in turn presses against the axially movable flange advancing the same towards the fixed flange or by withdrawing the adjusting member in which case the ring member and the axially movable flange will be free to move away from the fixed flange. The second variable sheave of the pair comprises an axially movable flange which is under the influence of a biasing means urging it towards the fixed flange. Thus, if a belt is trained around both sheaves and the movable flange of the first sheave provided with the adjusting arrangement is moved in the direction away from the fixed flange of the sheave, then the belt will be able to move closer towards the shaft after the sheave is mounted. At the same time, it will move farther away from the other shaft on which the second sheave of the pair is mounted, this particular movement being caused by the inwardly directed pressure of the movable flange of the second sheave. Thus, the belt is caused to exert an axial thrust upon the movable flange of the first sheave which it pushes axially away from the stationary flange of the first sheave in its tendency to move closer towards the shaft of the first sheave.

If the change in transmission ratio can be carried out slowly, that is if the adjusting arrangement can be operated slowly so that it withdraws gradually from the ring member and gradually permits the movable flange of the first sheave to move away from the stationary flange thereof under the urging of the belt, then no problems exist because the movable flange will always be in engagement with the ring member and the latter will always be in engagement with the adjusting arrangement.

However, in circumstances where it is desired to effect a rapid change in the transmission ratio, it is necessary to rapidly withdraw the adjusting arrangement from the ring member. Thus, the axial movement of the slidable flange of the first sheave, which movement is initiated by the pull exerted upon the belt by the second sheave, does not take place fast enough to assure that the ring member will remain in contact with the adjusting arrangement. As a result, the contact between the adjusting arrangement and the ring member is temporarily disrupted and, although the ring member is freely rotatable with reference to the movable flange of the first sheave, it will be subjected to angular displacement by the rotating movable flange. This is highly undesirable because it results not only in disturbing noises, but also in friction and consequent wear between the engaging surfaces of the ring member and of the adjusting arrangement both when the ring member initially loses contact with the adjusting member and later when this contact is reestablished.

SUMMARY OF THE INVENTION

The present invention overcomes these disadvantages.

More particularly, the present invention provides an arrangement wherein, under the circumstances described above, significant relative angular displacement of the ring member and the adjusting arrangement is prevented.

The arrangement according to the present invention thus not only eliminates the undesirable noises which are found very disturbing by the machine operators, but also eliminates the wear upon the components involved, and which resulted from relative angular displacement of such components under the circumstances discussed.

In accordance with one feature of my invention I provide, in a structure of the type here under discussion, a rotatable shaft on which a first flange is fixedly mounted A ring member is arranged on the shaft with freedom of axial and rotational movement relative thereto. A second flange is also arranged on the shaft intermediate the ring member and first flange to which latter is coupled in such a manner that it must shear rotational movement of the first flange but is free to move axially relative thereto. The second flange of course will have a tendency towards axial movement away from the first flange under the circumstances discussed, namely under the urging of the transmission belt.

Biasing means is provided and includes an engaging member which is axially spaced from the ring member and so arranged that it is movable between a first position in which it engages the ring member which latter is thereby prevented from rotation relative to the movable second flange and urges the ring member axially against this second flange, and a second position in which the engaging member is axially spaced from the ring member, thus permitting the same to move axially when the second flange exhibits such a tendency under the urging of the belt, the ring member being in this position of the engaging member free to rotate. To prevent this latter occurrence I further provide limiting means which is operative for limiting the angular displacement of the ring member with reference to the engaging member when the latter moves to the second position thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
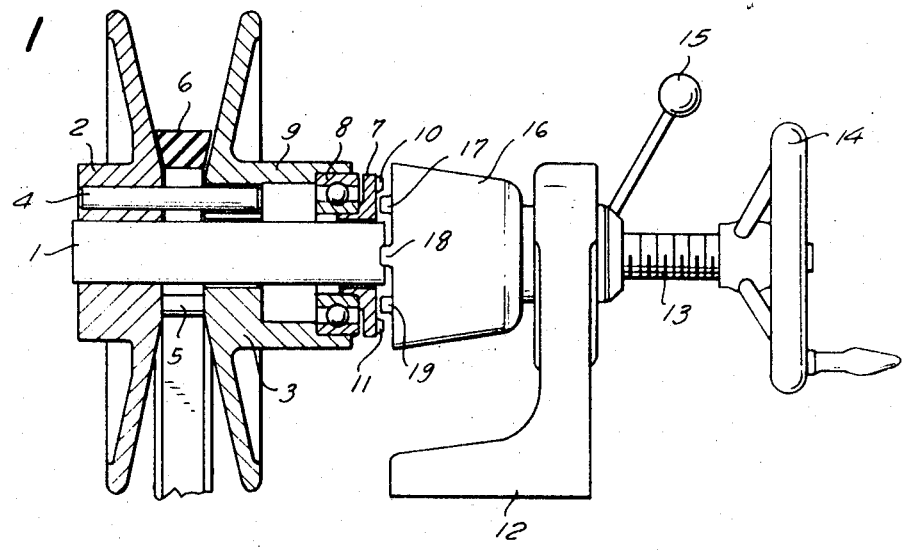
FIG. 1 is a somewhat schematic illustration, partly in longitudinal section, of a combination embodying my invention.
Figure 2:
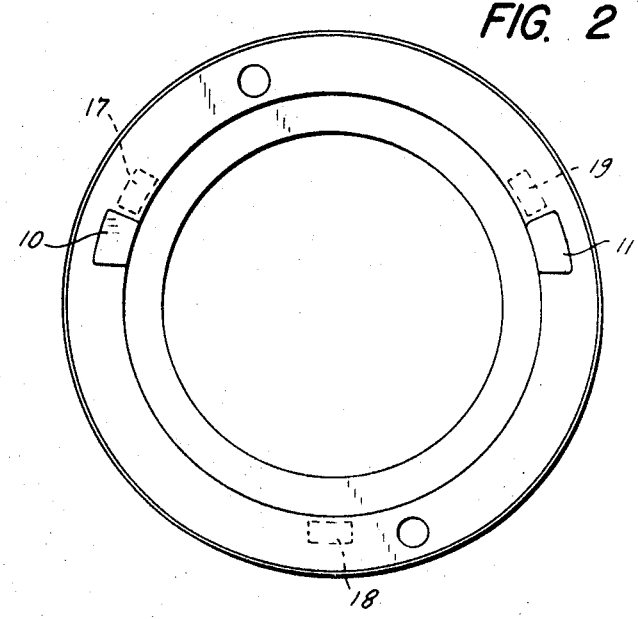
FIG. 2 is a schematic detail view illustrating certain components shown in FIG. 1.

Discussing now the drawing in detail, and firstly FIGS. 1 and 2 thereof, it will be noted that a shaft 1 has mounted thereon a stationary flange 2, which is to say that the flange 2 is neither axially nor rotationally moveable with reference to the shaft 1. A second flange 3 is also mounted on the shaft 1, but is axially slidable thereon. The second flange 3 is connected with the first flange 2, by means of pins or bolts 4 and 5 so that it must share rotational movement of the flange 2 and thereby of the shaft 1. However, the flange 3 is axially slidable with reference to the flange 2 because the bolts 4 and 5 permit such movement. The transmission belt 6, which is connected with another variable sheave (not illustrated) in usual manner, is received between the flanges 2 and 3 as illustrated in FIG. 1.

A ring member 7 surrounds the shaft 1 and is movable axially as well as rotationally with reference thereto. The hub 9 of the shiftable or movable flange 3 is supported on the shaft 1 by means of anti-friction bearings 8, and the ring member 7 engages these anti-friction bearings 8. A conventional adjusting device consists of a support 12 on which an adjusting spindle 13 is screw-threadedly mounted and can be turned by the hand wheel 14. The spindle 13 is fixed in its desired position, that is prevented from undesired turning movement, by the blocking lever 15 whose operation is conventional and need not be further described. Mounted on the spindle 13 is an engaging member 16, a so-called bell 16, whose engaging surface facing the annular end face of the ring member 7 is provided with pressure members 17, 18 and 19 which are angularly spaced. This is more clearly seen in FIG. 2. The end face of the ring member 7 is in turn provided with engaging projections 10 and 11 which are also angularly spaced, as shown in FIG. 2. Rotation of the handwheel 14 in the sense threading spindle 13 deeper through the support 12 and in the direction towards the left-hand side of FIG. 1 will advance the projections 17, 18 and 19 of the bell 16 against the end face of the ring member 7. This, in turn will push the ring member 7 against the anti-friction bearing 8 and will thereby displace the movable flange 3 in the direction towards the stationary flange 2. Such movement effects radial shifting of the bell 16 away from the shaft 1. Evidently, the other end of the belt 6 that is where the belt 6 is trained around the other (non-illustrated) adjustable sheave, will at the same time move closer towards the shaft on which that sheave is mounted. This effects a change in the transmission ratio.

Whenever it is desired to effect a quick reversal in this change of transmission ratio, the wheel 14 is turned in a sense withdrawing the spindle 13 from the support 12, and thereby withdrawing the bell 16 out of engagement with the end face of the ring member 7. Under circumstances where such withdrawal is too fast for the axial movement of the movable flange 3 to maintain the ring member 7 in engagement with the bell 16 the ring member 7 will have a tendency to rotate under the influence of the rotation of the movable flange 3. It is this rotation which is to be prevented in accordance with the present invention, and this is achieved by so arranging the projections 10 and 11 with reference to the projections 17, 18 and 19, that one of the projections 10 or 11 will engage one of the projections 17, 18 or 19 immediately or almost immediately upon the initiation of such rotation of the ring member 7. This is most clearly illustrated in FIG. 2 where it is evident that, when the ring member 7 begins to rotate, the projection 10 will engage the projection 17 if the rotation takes place in one direction whereas if the rotation takes place in the other direction, the projection 11 will engage the projection 19. This of course means that rotation is effectively prevented because of the amount of angular displacement possible for the ring member 7 is extremely small. Thus, engagement of the respective projections with one another will cause little or no noise and friction between the members 7 and 16, and the resultant damage is avoided.

Figure 3:
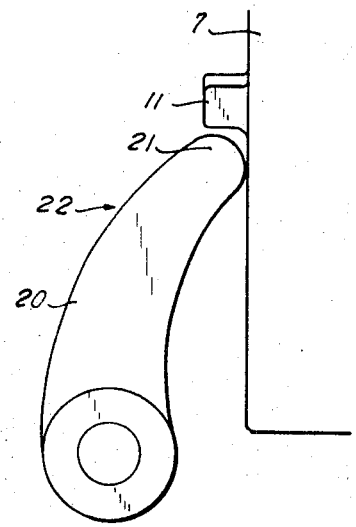
FIG. 3 illustrates a further embodiment of the invention.

FIG. 3 illustrates another embodiment of the invention wherein the bell 16 is replaced by a bifurcated member, or carries such a bifurcated member in place of the projections 17, 18 and 19. In this embodiment the bifurcated member is generally indicated with reference numeral 20 and comprises two engaging portions 21 and 22 which press against the end face of the ring member 7 in the same manner in which the projections 17–19 do this in the embodiment of FIG. 1. The sections 21 and 22 of the bifurcated member 20 are advantageously spaced angularly with reference to one another by 180°, although different spacing is also possible. Whenever the member 20 is withdrawn under the same circumstances as has been described above with reference to FIG. 1, and when the ring member 7 begins its angular displacement, the projections 10, 11 of the ring member 7 will engage one of the sections 21, 22 of the bifurcated member 20 almost immediately upon initiation of the angular displacement of the ring member 7, which angular displacement is thus effectively terminated.

In other respects, the embodiment of FIG. 3 is the same as that of FIG. 1.

Figures 4, 5:
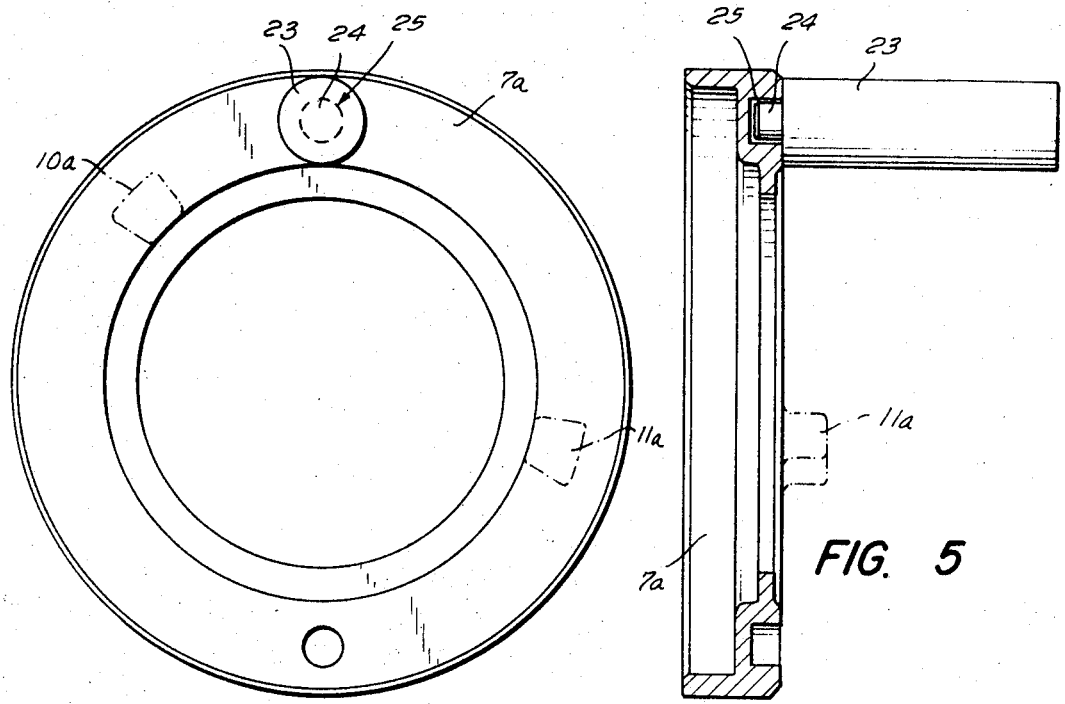
FIG. 4 is a plan view of an additional embodiment of the invention.
FIG. 5 is a side view, partly sectioned, of the embodiment shown in FIG. 4.
Figure 6:
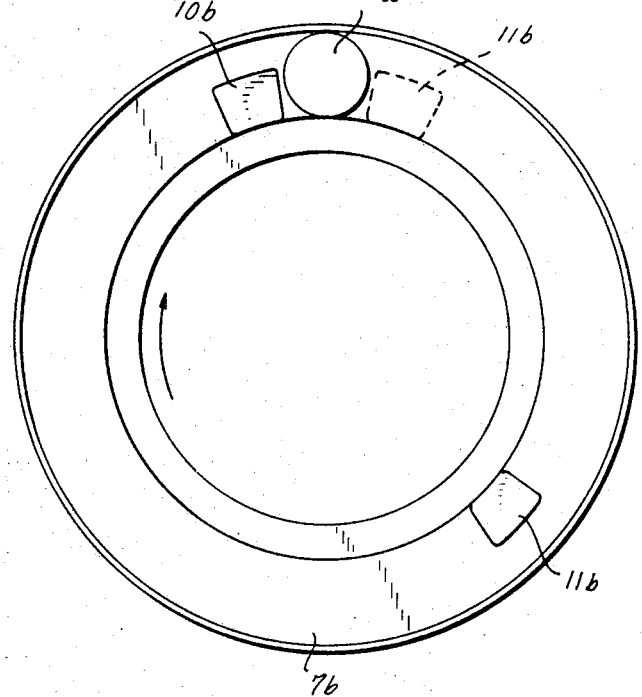
FIG. 6 is a plan view of the embodiment of FIG. 4 in an operative position thereof.
Figure 7:
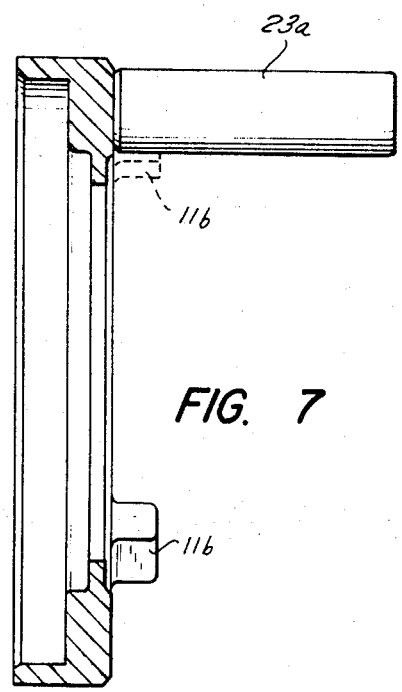
FIG. 7 is a side view, partly sectioned, of the embodiment of FIG. 4 in the position illustrated in FIG. 6.

Coming, finally, to the embodiments of FIGS. 4–7, it will be seen that here the member 16 and the bifurcated element 20 are replaced by a cylindrical bolt 23 whose purpose is to engage the ring member 7 in the same manner in which this has been described with reference to FIG. 1. If such a bolt 23 is used I have found it advantageous to provide it with a projecting portion 24, which may be formed on the bolt 23 by material removal or in another suitable manner, and the ring member 7a will in this case be provided with a recess or bore 25 into which the projection 24 of the bolt 23 extends. This is illustrated in FIGS. 4 and 5. FIGS. 6 and 7, on the other hand, show that such a bolt, which is here identified with reference numeral 23a, may be used just as advantageously with a ring member 7b which is configurated in identically the same manner as that shown in FIG. 1. In other words, the projection 24 need not be provided and the bolt 23a will simply engage either the projection 10b or the projection 11b of the ring member 7b when the latter is angularly displaced with reference to the position of the bolt 23a. Under these circumstances the bore 25 illustrated in FIGS. 4 and 5 is of course not necessary. FIG. 6 shows that in one direction of rotation of the ring member 7b the bolt 23a will be engaged by the projection 10b whereas such engagement with the projection 11b is illustrated in dashed lines to indicate that it will take place if the ring member 7b rotates in the direction opposite the first mentioned direction. In the section of FIG. 7, which illustrates the position of FIG. 6, the projection 10b which abuts against the bolt 23a is not shown. However, the abutment of the projection 11b with bolt 23a which abutment would occur if the direction of rotation where other than that indicated by the arrow in FIG. 6, is shown in dashed lines.

It will be understood that each of the elements described above, or two or more together, may also find a useful application in other types of arrangements, differing from the types described above.

While the invention has been illustrated and described as embodied in a variable-sheave arrangement, it is not intended to be limited to the details shown since various modifications and structural changes may be made without departing in any way from the spirit of the present invention.

What is claimed as new and desired to be protected by Letters Patent is set forth in the appended claims:

1. In a structure of the character described a combination comprising a rotatable shaft; a first flange fixedly mounted on said shaft; a ring member arranged on said shaft with freedom of axial and rotational movement relative thereto; a second flange arranged on said shaft intermediate said ring member and said first flange and being coupled to the latter with freedom of axial movement relative thereto, said second flange having a tendency to axial movement away from said first flange; biasing means, including an engaging member axially spaced from said ring member at a side thereof remote from said second flange, said biasing member being movable between a first position engaging said ring member and urging the same axially against said second flange while preventing rotation of said ring member, and a second position axially spaced from said ring member so that the latter is free to move axially and angularly under the influence of said second flange; and limiting means operative for limiting angular displacement of said ring member relative to said engaging member upon movement of the latter to said second position.

2. In a structure as defined in claim 1, wherein said ring member has an annular axial endface facing away from said second flange, said engaging member having an engaging surface facing said endface; and wherein said limiting means comprises cooperating engaging portions provided on said endface and said surface, respectively.

3. In a structure as defined in claim 2, wherein said engaging portions comprise first and second projections extending towards one another from said endface and said surface, respectively.

4. In a structure as defined in claim 3, wherein said first projections are angularly spaced defining a first circle of predetermined diameter, said second projections also being angularly spaced defining a second circle of substantially identical diameter, said first and second projections being arranged for cooperative engagement with one another in a sense preventing angular displacement of said ring member with reference to said engaging member in any direction of rotation.

5. In a structure as defined in claim 2, wherein said engaging portions comprise three projections provided on said engaging surface with a spacing of 120° relative to one another, and two additional projections provided on said endface with a spacing of between 120° and 180° relative one another, each of said additional projections extending into the space between two adjacent ones of said projections.

6. In a structure as defined in claim 1, wherein said engaging member comprises a bifurcated portion including two angularly spaced engaging sections, said ring member having an annular endface facing away from said second flange and being engaged by said engaging sections in said second position of said engaging member; and wherein said limiting means comprises a pair of projections extending from said annular endface and being angularly spaced from one another by a distance different from the angular spacing of said engaging sections.

7. In a structure as defined in claim 6, wherein said projections are angularly spaced by a distance slightly greater than the angular spacing of said engaging sections.

8. In a structure as defined in claim 6, wherein said projections are angularly spaced by a distance slightly smaller than the angular spacing of said engaging sections.

References Cited

UNITED STATES PATENTS

| 3,006,221 | 10/1961 | Cromwell. | |
| 3,195,364 | 7/1965 | Pauli | 74—230.17 |
| 3,200,661 | 8/1965 | Chambers | 74—230.17 |
| 3,324,736 | 6/1967 | Bassoff | 74—230.17 |

FRED C. MATTERN, JR., Primary Examiner

JAMES A. WONG, Assistant Examiner